United States Patent
Son et al.

(10) Patent No.: US 10,718,080 B2
(45) Date of Patent: Jul. 21, 2020

(54) METHOD OF CONTROLLING LAUNDRY TREATING APPARATUS

(71) Applicant: LG ELECTRONICS INC., Seoul (KR)

(72) Inventors: Junyoung Son, Seoul (KR); Jaeyoung Kim, Seoul (KR); Minkyu Park, Seoul (KR); Jinhwan Son, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 248 days.

(21) Appl. No.: 15/608,717

(22) Filed: May 30, 2017

(65) Prior Publication Data

US 2017/0342633 A1    Nov. 30, 2017

(30) Foreign Application Priority Data

May 30, 2016    (KR) .................. 10-2016-0066790

(51) Int. Cl.
| | | |
|---|---|---|
| *D06F 39/02* | (2006.01) | |
| *D06F 34/28* | (2020.01) | |
| *D06F 37/26* | (2006.01) | |
| *D06F 39/00* | (2020.01) | |
| *D06F 39/08* | (2006.01) | |
| *H04L 12/28* | (2006.01) | |

(Continued)

(52) U.S. Cl.
CPC .............. *D06F 39/02* (2013.01); *D06F 34/28* (2020.02); *D06F 37/26* (2013.01); *D06F 39/008* (2013.01); *D06F 39/08* (2013.01); *D06F 25/00* (2013.01); *D06F 29/00* (2013.01); *D06F 33/00* (2013.01); *D06F 35/00* (2013.01); *D06F 2210/00* (2013.01); *H04L 12/2818* (2013.01)

(58) Field of Classification Search
CPC ........ D06F 39/02; D06F 39/005; D06F 39/08; D06F 39/008; D06F 37/26; D06F 2210/00; D06F 33/02; D06F 35/00; D06F 29/00; D06F 25/00; H04L 12/2818
See application file for complete search history.

(56) References Cited

U.S. PATENT DOCUMENTS

| | | | |
|---|---|---|---|
| 2003/0176928 A1 | 9/2003 | Lee et al. | |
| 2006/0005581 A1* | 1/2006 | Banba ................. | D06F 25/00 68/5 R |

(Continued)

FOREIGN PATENT DOCUMENTS

EP    2 647 756    10/2013

OTHER PUBLICATIONS

European Search Report dated Oct. 17, 2017 issued in Application No. 17173367.8.

*Primary Examiner* — Jessica Yuen
(74) *Attorney, Agent, or Firm* — Ked & Associates, LLP

(57) ABSTRACT

Disclosed is a method of controlling laundry treating apparatus including supplying power to a driving unit configured to rotate a drum, an input unit configured to input a control command and a communication unit configured to receive a remote control command transmitted from a remote control device, setting a remote control mode so as to operate the driving unit if the communication unit receives the remote control command, and executing a standby operation so as to cut off power supply to the driving unit and to maintain power supplied to the communication unit, when the remote control mode is set.

20 Claims, 4 Drawing Sheets

(51) Int. Cl.
  *D06F 33/00* (2020.01)
  *D06F 25/00* (2006.01)
  *D06F 29/00* (2006.01)
  *D06F 35/00* (2006.01)

(56) References Cited

U.S. PATENT DOCUMENTS

| | | | |
|---|---|---|---|
| 2007/0107140 A1 | 5/2007 | Choi et al. | |
| 2008/0072450 A1* | 3/2008 | Kim | D06F 58/28 34/524 |
| 2013/0185079 A1* | 7/2013 | Park | D06F 33/02 704/275 |
| 2015/0167222 A1 | 6/2015 | Hwang et al. | |

* cited by examiner

METHOD OF CONTROLLING LAUNDRY TREATING APPARATUS

CROSS-REFERENCE TO RELATED APPLICATION

Pursuant to 35 U.S.C. § 119(a), this application claims the benefit of Korean Patent Application No. 10-2016-0066790 filed May 30, 2016 which is hereby incorporated by reference as if fully set forth herein.

BACKGROUND OF THE INVENTION

Field of the Invention

The present invention relates to a method of controlling a laundry treating apparatus.

Discussion of the Related Art

In general, laundry treating apparatuses include an apparatus which washes laundry, an apparatus which dries laundry, and an apparatus which performs both washing and drying of laundry.

A laundry treating apparatus which may wash laundry generally includes a cabinet, a tub provided within the cabinet to store water, a drum rotatably provided within the tub to accommodate laundry, and a driving unit to rotate the drum, and an apparatus which may dry laundry generally includes a cabinet, a drum provided within the cabinet to accommodate laundry, a driving unit to rotate the drum, and an air supply unit to supply heated air to the drum.

Among conventional laundry treating apparatuses having the above-describe structure, there is an apparatus provided with a remote control mode. The remote control mode means a control mode in which a user away from a laundry treating apparatus transmits a control command to the laundry treating apparatus through a portable remote control device (for example, a mobile phone).

The above-described conventional laundry treating apparatus, if a user selects the remote control mode, should be maintained in a state in which power is supplied to all elements required to operate the laundry treating apparatus. The reason for this is that, when the user transmits a control command to the laundry treating apparatus through the remote control device, the laundry treating apparatus needs to be immediately operated.

Therefore, since power should be supplied to all elements required to operate the laundry treating apparatus until the laundry treating apparatus receives the control command transmitted from the remote control device, the above-described conventional laundry treating apparatus consumes a large amount of standby power.

SUMMARY OF THE INVENTION

Accordingly, the present invention is directed to a method of controlling a laundry treating apparatus that substantially obviates one or more problems due to limitations and disadvantages of the related art.

An object of the present invention is to provide a laundry treating apparatus which may minimize standby power consumption, and a method of controlling the same.

Another object of the present invention is to provide a laundry treating apparatus which supplies power only to means necessary to receive a remote control command, when a remote control mode is set, and may thus minimize standby power consumption, and a method of controlling the same.

Another object of the present invention is to provide a laundry treating apparatus which releases a remote control mode, when a door opens an inlet so that the laundry treating apparatus is not operable, and may thus minimize consumption of standby power, and a method of controlling the same.

Yet another object of the present invention is to provide a laundry treating apparatus which, when an error occurs, does not execute a control method thereof and cuts off power supply to the laundry treating apparatus so as to resolve the error and may thus minimize power consumption, and a method of controlling the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of controlling a laundry treating apparatus, including a cabinet provided with an inlet, a drum to accommodate laundry supplied through the inlet, a door to open and close the inlet, a driving unit provided within the cabinet to rotate the drum, an input unit provided on any one of the door and the cabinet to input a control command, and a communication unit provided on any one of the door and the cabinet to receive a remote control command transmitted from a remote control device, includes supplying power to the driving unit, the input unit and the communication unit, setting a remote control mode through the input unit so as to operate the driving unit, if the communication unit receives the remote control command, and executing a standby operation so as to cut off power supply to the driving unit and to maintain power supplied to the communication unit, when the remote control mode is set.

The method may further include supplying power to the driving unit, when the communication receives the remote control command, and executing the remote control command so as to rotate the drum through the driving unit.

In the standby operation, power supplied to the input unit may be maintained.

The method may further include cutting off power supply to the input unit and the communication unit, if a control command to release the remote control mode is input during execution of the standby operation.

The control command to release the remote control mode may be received through the communication unit or input through the input unit.

The laundry treating apparatus may further include a permanent magnet provided in the cabinet and a magnetic sensor provided on the door and sensing magnetic force of the permanent magnet to judge whether or not the inlet is open or closed, in supply of power, power may be supplied to the driving unit, the input unit, the communication unit and the magnetic sensor, and, in execution of the standby operation, power supplied to the driving unit may be cut off and power supplied to the input unit, the communication unit and the magnetic sensor may be maintained.

The method may further include cutting off power supply to the input unit, the communication unit and the magnetic sensor, upon judging that the inlet is open during execution of the standby operation.

The method may further include supplying power to the driving unit, when the communication unit receives the remote control command transmitted from the remote control device, and executing the remote control command so as to operate the driving unit to rotate the drum.

The method may further include cutting off power supply to the driving unit, the input unit, the communication unit and the magnetic sensor, if an error occurs during execution of the remote control command.

If an amount of water supplied to the tub exceeds a predetermined reference water level, if the amount of water supplied to the tub does not reach the reference water level, if the RPM of the drum exceeds a predetermined reference RPM, or if the frequency of the drum exceeds a predetermined frequency, it may be judged that the error occurs.

The laundry treating apparatus may further include a water supply pipe configured to connect a water supply source to the tub providing a space to receive the drum, and a water supply valve configured to open and close the water supply pipe, in supply of power, power may be supplied to the driving unit, the input unit, the communication unit, the magnetic sensor and the water supply valve, and, in execution of the standby operation, power supplied to the driving unit and the water supply valve may be cut off and power supplied to the input unit, the communication unit and the magnetic sensor may be maintained.

The laundry treating apparatus may further include a drain pump configured to discharge water stored in the tub to the outside of the tub, in supply of power, power may be supplied to the driving unit, the input unit, the communication unit, the magnetic sensor, the water supply valve and the drain pump, and, in execution of the standby operation, power supplied to the driving unit, the water supply valve and the drain pump may be cut off and power supplied to the input unit, the communication unit and the magnetic sensor may be maintained.

In another aspect of the present invention, a method of controlling a laundry treating apparatus, including a cabinet provided with an inlet, a drum to accommodate laundry supplied through the inlet, a door to open and close the inlet, a driving unit provided within the cabinet to rotate the drum, an input unit provided on the door to input a control command, and a communication unit provided on the door to receive a remote control command transmitted from a remote control device, includes supplying power to the driving unit, the input unit and the communication unit, setting a remote control mode through the input unit so as to operate the driving unit, if the communication unit receives the remote control command, and executing a standby operation so as to cut off power supply to the driving unit and to maintain power supplied to the communication unit, when the remote control mode is set.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
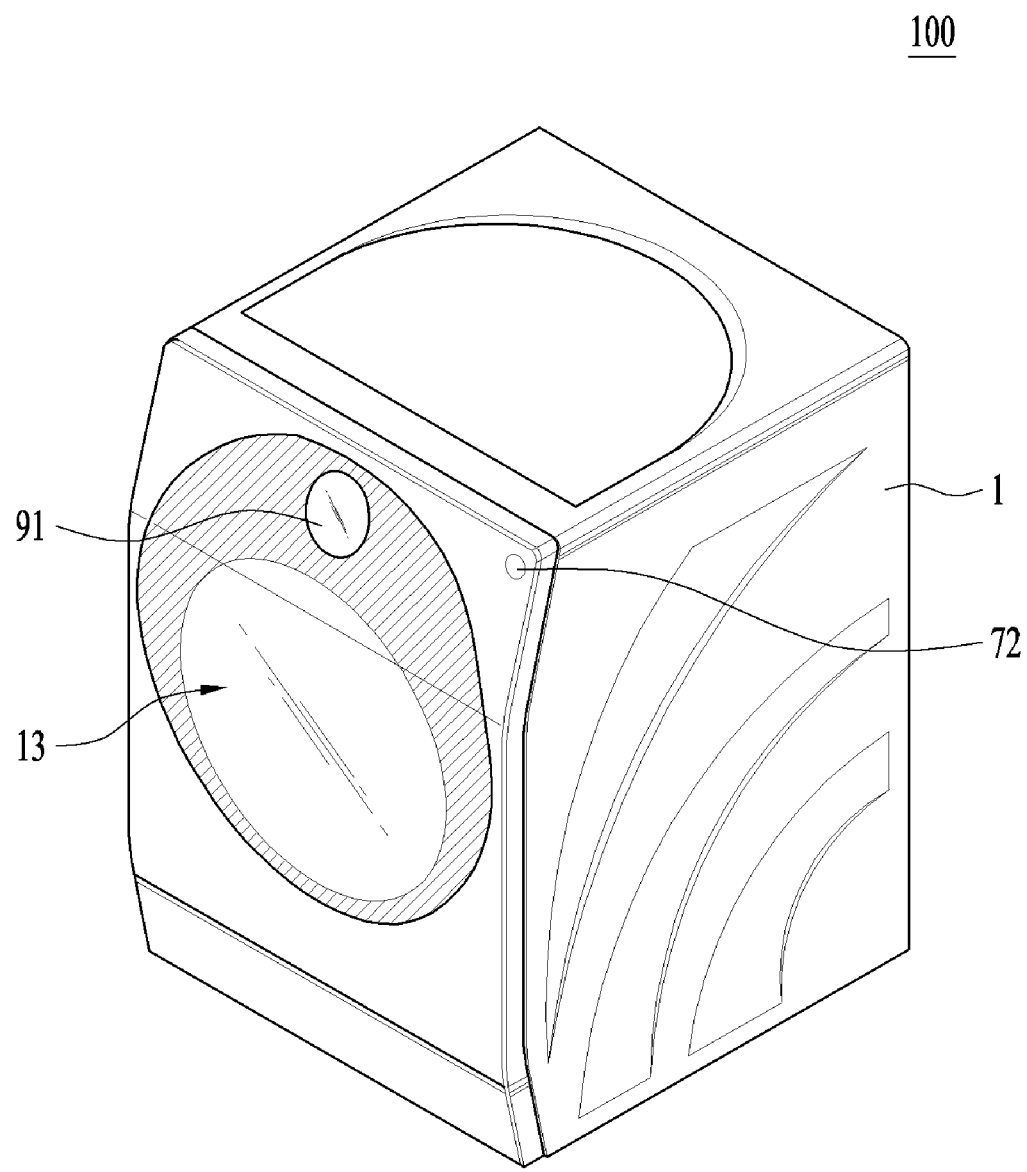
FIGS. 1 and 2 are perspective and longitudinal-sectional views of a laundry treating apparatus in accordance with one embodiment of the present invention.

Reference will now be made in detail to the preferred embodiments of the present invention, examples of which are illustrated in the accompanying drawings. A configuration or control method of an apparatus which will be described below serves only to describe embodiments of the present invention and does not limit the scope of the invention. In the drawings, the same or similar elements are denoted by the same reference numerals even though they are depicted in different drawings.

As exemplarily shown in FIG. 1, a laundry treating apparatus 100 in accordance with the present invention may include a cabinet 1, a tub 3 provided within the cabinet 1 and providing a space to store water, and a drum 5 rotatably provided within the tub 3 and providing a space to accommodate laundry.

Figure 2:
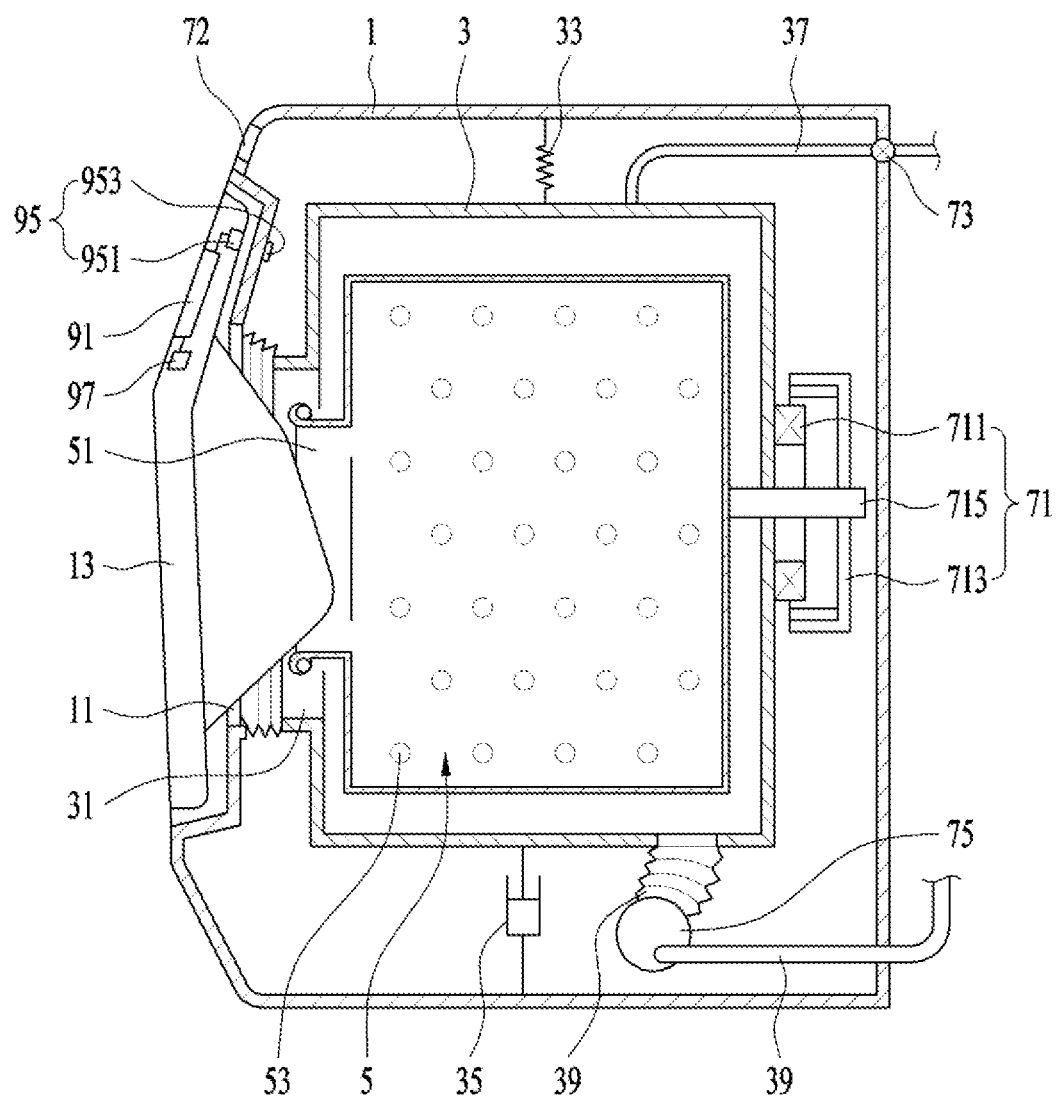

As exemplarily shown in FIG. 2, an inlet 11 to put laundry into the drum 5 or take laundry out of the drum 5 is provided at the front surface of the cabinet 1, and the inlet 11 is open and closed by a door 13 fixed to the cabinet 1 so as to be rotatable.

A control panel 91 which receives a control command from a user and displays an execution process of the control command may be provided on the door 13.

The laundry treating apparatus 100 of the present invention may include a sensing unit 95 to judges whether or not the door 13 opens the inlet 11. The sensing unit 95 may include a permanent magnet 953 provided in the cabinet 1, and a magnetic sensor 951 provided on the door 13 to sense magnetic force of the permanent magnet 953.

The tub 3 is provided with a tub inlet 31 communicating with the inlet 11. The tub 3 is fixed to the inside of the cabinet 1 through support parts, and the support parts may include a spring 33 connecting the upper circumferential surface of the tub 3 to the cabinet 1 and a damper 35 connecting the lower circumferential surface of the tub 3 to the bottom of the cabinet 1.

The tub 3 may receive water supplied through a water supply pipe 37, and water supplied to the inside of the tub 3 may be discharged to the outside of the cabinet 1 through a drain pipe 39.

The water supply pipe 37 may be provided to connect a water supply source (not shown) to the tub 3 and be open and closed by a water supply valve 73 provided on the cabinet 1. A drain pump 75 is provided on the drain pipe 39 and, when the drain pump 75 located within the cabinet 1 is operated, water stored in the tub 3 is discharged to the outside of the cabinet 1.

The drum 5 includes a drum inlet 51 communicating with the inlet 11 and the tub inlet 31, and a plurality of through holes 53, via which the inside of the drum 5 communicates with the inside of the tub 3.

The drum 5 is rotated by a driving unit 71 provided within the cabinet 1. The driving unit 71 may include a stator 711 fixed to the rear surface of the tub 3 so as to generate a rotating field when current is supplied thereto, a rotor 713 rotated by the rotating field, and a rotary shaft 715 passing through the tub 3 and thus connecting the rotor 713 to the drum 5.

Figure 3:
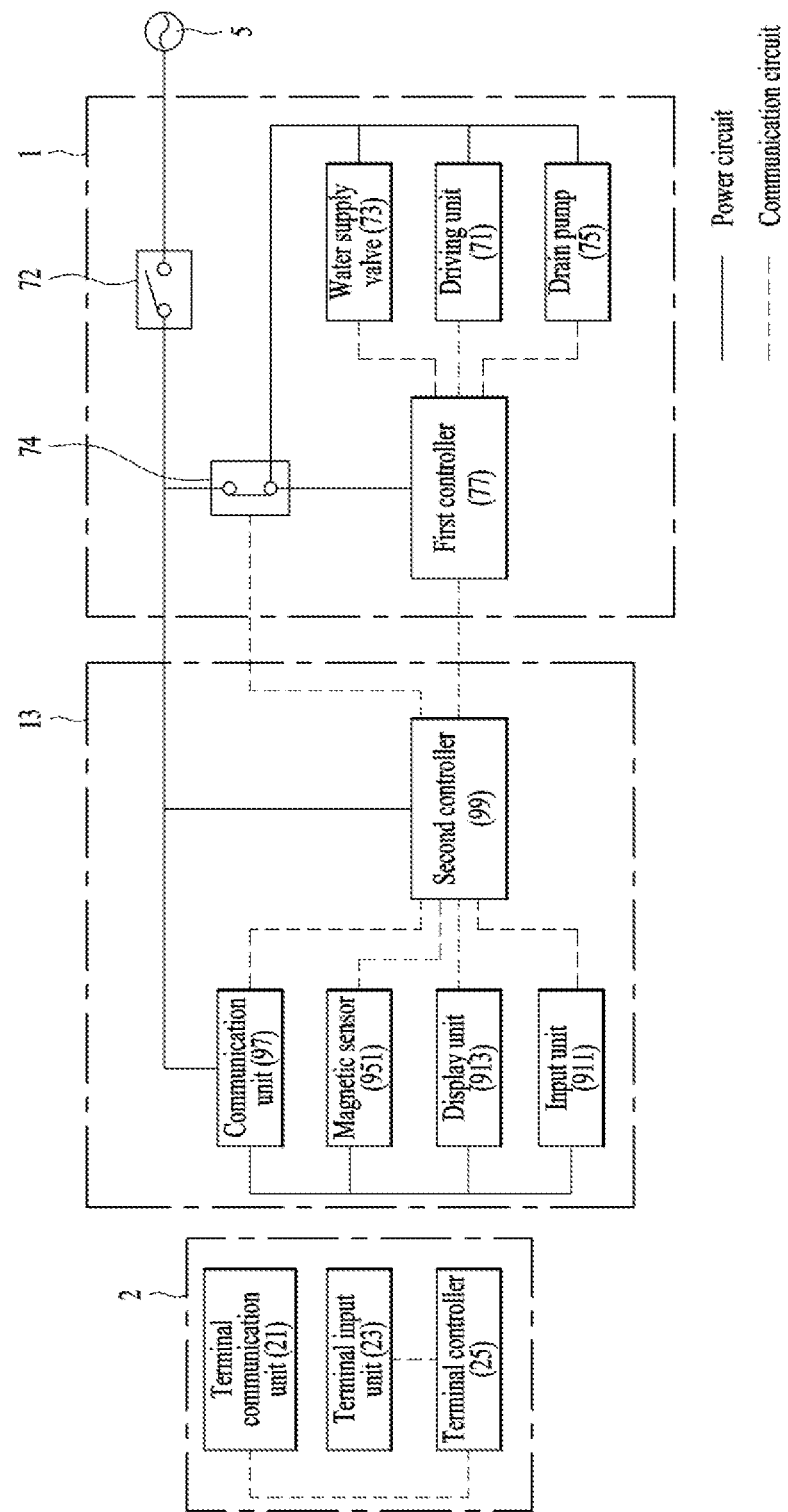
FIG. 3 is a block diagram illustrating a first controller, a second controller and a remote controller provided in the laundry treating apparatus.

As exemplarily shown in FIG. 3, the water supply valve 73, the drain pump 75 and the driving unit 71 provided in or on the cabinet 1 are controlled by a first controller 77 provided in the cabinet 1, and the control panel 91, a communication unit 97 and the magnetic sensor 951 provided in or on the door 13 is controlled by a second controller 99. The first controller 77 and the second controller 99 are connected so as to be communicable with each other.

The control panel 91 may include an input unit 911 to which a control command from a user is input, and a display unit 913 to display operating information of the laundry treating apparatus 100. The operating information of the laundry treating apparatus 100 may include control commands selectable by a user, a control command selected by the user, and information regarding the execution process of the control command selected by the user (an operating time, a residual time, etc.)

The communication unit 97 is a means which receives a control command (a remote control command) transmitted by a remote control device 2 which is operated independently of the laundry treating apparatus 100.

The remote control device 2, which is a terminal (for example, a portable phone) provided so as to be communicable with the laundry treating apparatus 100, may include a terminal communication unit 21, a terminal input unit 23 through which a user inputs a control command to the remote control device 2, and a terminal controller 25 controlling the terminal communication unit 21 and the terminal input unit 23. Therefore, a remote control command which a user inputs to the remote control device 2 may be transmitted to the second controller 99 and the first controller 77 through the terminal communication unit 21 and the communication unit 97.

The magnetic sensor 951 may be provided to output an electrical signal (voltage, etc.) having different intensities according to intensities of magnetic force. In this case, the second controller 99 may judge that the inlet 11 is closed, if the intensity of magnetic force sensed by the magnetic sensor 953 is a predetermined reference value or more, and judge that the inlet is closed, if the intensity of magnetic force sensed by the magnetic sensor 953 is less than the reference value.

Any one of the cabinet 1 and the door 13 may be provided with a power input unit (a first switch) 72 to supply power to the laundry treating apparatus 100. When a user presses the first switch 72, a power source S is connected to the driving unit 71, the water supply valve 73, the drain pump 75, the first controller 77, the control panel 91, the magnetic sensor 951, the communication unit 97 and the second controller 99 and, thus, power is supplied thereto.

Figure 4:
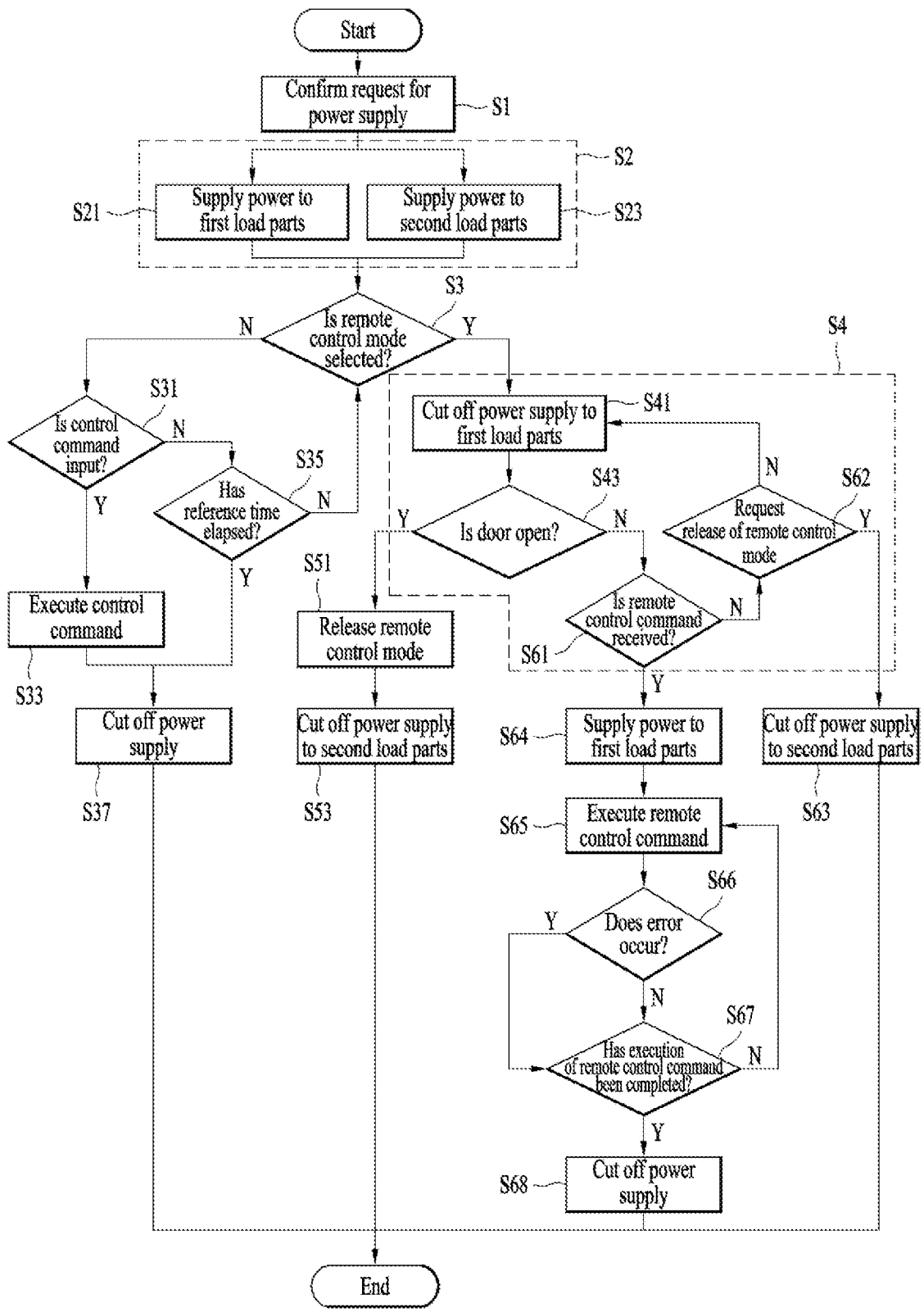
FIG. 4 is a flowchart illustrating a method of controlling a laundry treating apparatus in accordance with one embodiment of the present invention.

FIG. 4 is a flowchart illustrating a method of controlling a laundry treating apparatus in accordance with one embodiment of the present invention.

The control method of the present invention is started from supply of power to the laundry treating apparatus 100 (Operation S2). Supply of power (Operation S2) may be executed when a user requests power supply to the laundry treating apparatus 100 through the first switch 72 (Operation S1).

Supply of power (Operation S2) may include supplying power to first load parts located within the cabinet 1 (Operation S21) and supplying power to second load parts provided on the door 13 (Operation S23)

The first load parts and the second load parts mean elements requiring power supply out of the elements of the laundry treating apparatus 100. The first load parts mean elements provided in the cabinet 1, and the second load parts mean elements provided in or on the door 13.

That is, the first load parts may be the driving unit 71, the water supply valve 73, the drain pump 75 and the first controller 77, and the second load parts may be the input unit 911, the display unit 913, the magnetic sensor 951, the communication unit 97 and the second controller 99.

When supply of power (Operation S2) has been completed, whether or not a remote control mode is set is judged (Operation S3).

The remote control mode means a mode in which, if the communication unit 97 receives a control command (a remote control command) transmitted from the remote control device 2, the first load parts are operated according to the remote control command.

Selection of the remote control mode may be carried out through the input unit 911 provided on the door 13, or be carried out through the remote control device 2. If the remote control mode is selected through the remote control device, the second controller 99 may judge that the remote control mode is selected when a control command for selecting the remote control mode is input to the communication unit 97.

If the remote control mode is not selected, whether or not a control command (selection of a washing course, etc.) necessary to operate the laundry treating apparatus 100 is input is judged (Operation S31).

When the user inputs a control command through the input unit 911, the input control command is executed (Operation S33) and then power supply to the first load parts and the second load parts is cut off (Operation S37).

However, if the remote control mode is not selected and a control command is not input within a predetermined reference time (Operations S31 and S35), power is cut off (Operation S37) and, thus, standby power consumption of the laundry treating apparatus 100 is minimized.

On the other hand, upon judging that the remote control mode is selected (Operation S3), a standby operation is executed (Operation S4).

In the standby operation (Operation S4), whether or not the communication unit 97 receives the remote control command transmitted from the remote control device 2 is periodically judged. The Operation S4 includes cutting off power supply to the first load parts (Operation S41), judging whether or not the door 13 opens the inlet 11 (Operation S43), and judging whether or not the communication unit 97 receives the remote control command (Operation 61)

In cutting-off of power supply to the first load parts (Operation S41), only power supply to the first load parts is cut off and, thus, power supply to the second load parts is maintained.

In the standby operation (Operation S4), cutting-off of power supply to the first load parts 71, 73, 75 and 77 (Operation S41) minimizes standby power consumption of the laundry treating apparatus 100 during the standby operation (Operation S4).

That is, considering that elements necessary to execute the standby operation (Operation S4) are the second load parts 911, 913, 951, 97 and 99 provided in or on the door 13, standby power consumption of the laundry treating apparatus 100 may be minimized by supplying power only to the second load parts in the standby operation (Operation S4).

In the standby operation (Operation S4), power may be supplied to all of the second load parts 911, 913, 951, 97 and 99 or be supplied to some of the second load parts 911, 913, 951, 97 and 99. FIG. 4 exemplarily illustrates a case in that power is supplied only to the communication unit 97, the magnetic sensor 951, the input unit 911 and the second controller 99 out of the second load parts.

When power supply to the first load parts is cut off (Operation S41), whether or not the door 13 opens the inlet 11 is judged (Operation S43).

The remote control mode means a mode in which a user away from a home, where the laundry treating apparatus is installed, transmits a control command to the laundry treating apparatus to operate the laundry treating apparatus and, thus, in order to execute the remote control mode, the closed state of the inlet 11 by the door 13 should be maintained.

If the laundry treating apparatus is operated in the open state of the inlet 11, laundry accommodated in the drum 5 or water supplied to the tub 3 may be discharged to the outside of the cabinet 1 through the inlet 11.

Therefore, upon judging that the door 13 opens the inlet 11, the remote control mode is released (Operation S51) and then power supplied to the second load parts is cut off (Operation S53). This serves to minimize standby power consumption of the laundry treating apparatus 100.

In judgment as to whether or not the door 13 opens the inlet 11 (Operation S43), the second controller 99 may compare an intensity of magnetic force sensed by the magnetic sensor 951 to a reference value.

Upon judging that the door 13 closes the inlet 11 (Operation S43), whether or not the communication unit 97 receives the remote control command transmitted from the remote control device 2 is judged (Operation S61).

Upon judging that the communication unit 97 does not receive the remote control command transmitted from the remote control device 2, whether or not a signal requesting release of the remote control mode is input is judged (Operation S62).

The signal requesting release of the remote control mode may be input through the input unit 911, or the communication unit 97 may receive the signal requesting release of the remote control mode transmitted from the remote control device 2.

When the signal requesting release of the remote control mode is input through the input unit 911 or the communication unit 97, power supplied to the second load parts is cut off (Operation S63) and, thus, standby power consumption of the laundry treating apparatus 100 is minimized.

However, if the communication unit 91 receives the remote control command transmitted from the remote control device 2 (Operation S61), power is supplied to the first load parts (Operation S64) and then the remote control command is executed (Operation S65).

In supply of power to the first load parts (Operation S64), the second controller 99 may control a second switch 74 (with reference to FIG. 3) which opens and closes a circuit to connect the power supply S to the first load parts.

In execution of the remote control command (Operation S65), when the second controller 99 transmits the remote control command received by the communication unit 97 to the first controller 77, the first controller 77 may control the driving unit 71, the water supply valve 73 and the drain pump 75 according to the remote control command.

For example, if the remote control command is a command requesting execution of a washing course in which laundry is washed with water, in execution of the remote control command (Operation S65), the first controller 77 may control the driving unit 71, the water supply valve 73 and the drain pump 75 according to the washing course selected through the remote control command.

Thereafter, whether or not an error occurs during execution of the remote control command (Operation S65) may be judged (Operation S66).

If an error occurs during execution of the remote control command (Operation S66), in order to resolve the error, the control method is not executed and power supply to the laundry treating apparatus 100 is cut off (Operation S68).

Here, if it is judged that an amount of water supplied to the tub 3 exceeds a predetermined reference water level, if the amount of water supplied to the tub 3 does not reach the reference water level, if the RPM of the drum 5 exceeds a predetermined reference RPM, or if the frequency of the drum 5 exceeds a predetermined frequency, it may be judged that an error occurs.

In order to judge the water level in the tub 3, a water level sensor (not shown), which transmits different electrical signals to the first controller 77 according to water levels, is further provided in the cabinet 1.

In order to judge the RPM of the drum 5 or the frequency of the drum 5, a sensing unit (not shown), which generates different electrical signals according to RPMs or frequencies of the drum 5, is further provided in the cabinet 1.

On the other hand, if no error occurs during execution of the remote control command, execution of the remote control command is completed (Operation S67) and then power supplied to both the first load parts and the second load parts is cut off (Operation S68).

Although the control method applied to a laundry treating apparatus to wash laundry has been described, the above-described control method may be applied to an apparatus to dry laundry.

In this case, an air supply unit (not shown) to supply heated air to laundry is further provided within a cabinet of the laundry drying apparatus. The air supply unit may include a first flow path to supply external air to a tub, a second flow path to discharge air from the tub to the outside, and a fan and a heater provided in the first flow path. In this case, the fan and the heater correspond to first load parts.

As is apparent from the above description, the present invention provides a laundry treating apparatus which may minimize standby power consumption in a remote control mode, and a method of controlling the same.

Further, the present invention provides a laundry treating apparatus which supplies power only to means necessary to receive a remote control command, when a remote control mode is set, and may thus minimize standby power consumption, and a method of controlling the same.

Further, the present invention provides a laundry treating apparatus which releases a remote control mode, when a door opens an inlet so that the laundry treating apparatus is not operable, and may thus minimize standby power consumption, and a method of controlling the same.

Moreover, the present invention provides a laundry treating apparatus which, when an error occurs, does not execute a control method thereof and cuts off power supply to the laundry treating apparatus so as to resolve the error and may thus minimize power consumption, and a method of controlling the same.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of controlling a laundry treating apparatus, the laundry treating apparatus including a cabinet having an inlet, a drum to accommodate laundry supplied through the inlet, a door to open and close the inlet, a driving unit provided within the cabinet to rotate the drum, an input unit provided on at least one of the door or the cabinet to input a control command, a communication unit provided on at least one of the door or the cabinet to receive a remote control command transmitted from a remote control device, a first control unit provided to operate the driving unit, a second control unit provided to operate at least one of the communication unit or the input unit, and a switch provided to selectively supply power to the first control unit and the driving unit, wherein the second control unit is provided to be electrically separated from the first control unit by the switch, the method comprising:
  entering a remote control mode through at least one of the input unit or the remote control device so as to operate the driving unit, when the communication unit receives the remote control command; and
  executing a standby operation that includes operating the switch so as to prevent supplying power to the first control unit and the driving unit,
  wherein the standby operation includes still supplying power to the second controller and the communication unit.

2. The method according to claim 1, further comprising:
  supplying power to the driving unit, the input unit, and the communication unit before the remote control mode is entered,
  wherein execution of the standby operation includes cutting off power supplied to the driving unit, and maintaining power supplied to the communication unit when the remote control mode is entered.

3. The method according to claim 2, further comprising:
  supplying power to the driving unit, when the communication receives the remote control command; and
  executing the remote control command so as to rotate the drum through the driving unit.

4. The method according to claim 3, wherein, in the standby operation, power supplied to the input unit is maintained.

5. The method according to claim 4, further comprising cutting off power supply to the input unit and the communication unit, if a control command to release the remote control mode is input during execution of the standby operation.

6. The method according to claim 5, wherein the control command to release the remote control mode is received through the communication unit or input through the input unit.

7. The method according to claim 6, wherein:
  the laundry treating apparatus further includes a permanent magnet provided in the cabinet, and a magnetic sensor provided on the door, the magnetic sensor sensing a magnetic force of the permanent magnet to determine whether the inlet is open or closed;
  power is supplied to the driving unit, the input unit, the communication unit, and the magnetic sensor before the remote control mode is entered; and
  during execution of the standby operation, power supplied to the driving unit is cut off, and power supplied to the input unit, the communication unit and the magnetic sensor is maintained.

8. The method according to claim 7, further comprising cutting off power supplied to the input unit, the communication unit, and the magnetic sensor, upon determining that the inlet is open during execution of the standby operation.

9. The method according to claim 8, further comprising:
  supplying power to the driving unit, when the communication unit receives the remote control command transmitted from the remote control device; and
  executing the remote control command so as to operate the driving unit to rotate the drum.

10. The method according to claim 9, further comprising cutting off power supply to the driving unit, the input unit, the communication unit and the magnetic sensor, if an error occurs during execution of the remote control command.

11. The method according to claim 10, wherein further comprising:
  determining that the error occurred when an amount of water supplied to a tub exceeds a reference water level, the amount of water supplied to the tub does not reach the reference water level, a rotational speed of the drum exceeds a reference rotational speed, or the frequency of the drum exceeds a reference frequency.

12. The method according to claim 10, wherein:
  the switch is a first switch,
  the laundry treating apparatus further includes a second switch that selectively supplies power to the laundry treating apparatus,
  the first switch selectively supplies power received via the second switch to the driving unit,
  supplying power to the driving unit, the input unit, the communication unit, and the magnetic sensor before the remote control mode is entered includes closing the second switch, and
  cutting off power supply to the driving unit, the input unit, the communication unit and the magnetic sensor when the error occurs during execution of the remote control command includes opening the second switch.

13. The method according to claim 7, wherein:
  the laundry treating apparatus further includes a water supply pipe configured to connect a water supply source to a tub providing a space to receive the drum, and a water supply valve configured to open and close the water supply pipe;
  power is supplied to the driving unit, the input unit, the communication unit, the magnetic sensor, and the water supply valve before the remote control mode is entered; and
  during execution of the standby operation, power supplied to the driving unit and the water supply valve is cut off, and power supplied to the input unit, the communication unit, and the magnetic sensor is maintained.

14. The method according to claim 13, wherein:
  the laundry treating apparatus further includes a drain pump configured to discharge water stored in the tub outside of the tub;
  power is supplied to the driving unit, the input unit, the communication unit, the magnetic sensor, the water supply valve, and the drain pump before the remote control mode is entered; and
  during execution of the standby operation, power supplied to the driving unit, the water supply valve and the drain pump is cut off, and power supplied to the input unit, the communication unit, and the magnetic sensor is maintained.

15. The method according to claim 14, wherein:

the switch is a first switch, the laundry treating apparatus further includes a second switch that selectively supplies power to the laundry treating apparatus, the first switch selectively supplies power received via the second switch to the driving unit, the water supply valve, and the drain pump, supplying power to the driving unit, the input unit, the communication unit, the magnetic sensor, the water supply valve, and the drain pump before the remote control mode is entered includes closing the second switch, and executing the standby operation includes opening the first switch to stop supplying power to the driving unit, the water supply valve, and the drain pump while the second switch remains closed such that power is maintained to the input unit, the communication unit, and the magnetic sensor.

16. The method according to claim 7, wherein:

the switch is a first switch, the laundry treating apparatus further includes a second switch that selectively supplies power to the laundry treating apparatus, the first switch selectively supplies power received via the second switch to the driving unit, supplying power to the driving unit, the input unit, the communication unit, and the magnetic sensor before the remote control mode is entered includes closing the second switch, and executing the standby operation includes opening the first switch to stop supplying power to the driving unit while the second switch remains closed such that power is maintained to the input unit, the communication unit, and the magnetic sensor.

17. The method according to claim 2, wherein:

the switch is a first switch, the laundry treating apparatus further includes a second switch that selectively supplies power to the laundry treating apparatus, the first switch selectively supplies power received via the second switch to the driving unit, supplying power to the driving unit, the input unit, and the communication unit before the remote control mode is entered includes closing the second switch, and executing the standby operation includes opening the first switch to stop supplying power to the driving unit while the second switch remains closed such that power continues to be supplied to the communication unit.

18. The method according to claim 1, wherein the driving unit includes:

a stator coupled to a tub which is provided to receive the drum to generate a rotating field when current is supplied thereto, a rotor rotated by the rotating field.

19. The method according to claim 1, wherein the input unit is included in a control panel.

20. The method according to claim 1, wherein:

the switch is a first switch, the laundry treating apparatus further includes a second switch that selectively supplies power to the laundry treating apparatus, the first switch selectively supplies power received via the second switch to the driving unit, and executing the standby operation includes closing the second switch and opening the first switch.

* * * * *